US008056125B2

(12) United States Patent
Hirose (10) Patent No.: US 8,056,125 B2
(45) Date of Patent: Nov. 8, 2011

(54) RECORDING MEDIUM STORING CONTROL PROGRAM AND COMMUNICATION SYSTEM

(75) Inventor: Yoichi Hirose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 823 days.

(21) Appl. No.: 11/605,301

(22) Filed: Nov. 29, 2006

(65) Prior Publication Data

US 2007/0283421 A1  Dec. 6, 2007

(30) Foreign Application Priority Data

Jun. 6, 2006  (JP) .................................. 2006-157351

(51) Int. Cl.
*H04L 29/06* (2006.01)

(52) U.S. Cl. ........................................................ 726/12

(58) Field of Classification Search ...................... 726/12
See application file for complete search history.

(56) References Cited

U.S. PATENT DOCUMENTS

| 5,586,260 | A | * | 12/1996 | Hu ................................. | 726/12 |
|---|---|---|---|---|---|
| 2002/0046170 | A1 | * | 4/2002 | Gvily ............................... | 705/42 |
| 2002/0078371 | A1 | * | 6/2002 | Heilig et al. ................... | 713/200 |
| 2002/0162026 | A1 | * | 10/2002 | Neuman et al. ............... | 713/201 |
| 2003/0013445 | A1 | * | 1/2003 | Fujiwara et al. .............. | 455/435 |
| 2003/0014668 | A1 | * | 1/2003 | Faccin et al. .................. | 713/201 |
| 2003/0061515 | A1 | * | 3/2003 | Kindberg et al. ............. | 713/201 |
| 2003/0115488 | A1 | * | 6/2003 | Kunito et al. ................. | 713/201 |
| 2003/0226036 | A1 | * | 12/2003 | Bivens et al. ................. | 713/201 |
| 2004/0030897 | A1 | * | 2/2004 | Hua et al. ...................... | 713/170 |
| 2005/0039054 | A1 | * | 2/2005 | Satoh et al. ................... | 713/201 |
| 2005/0086533 | A1 | * | 4/2005 | Hsieh ............................. | 713/201 |
| 2005/0114705 | A1 | * | 5/2005 | Reshef et al. ................. | 713/201 |
| 2005/0138426 | A1 | * | 6/2005 | Styslinger .................... | 713/201 |
| 2005/0197121 | A1 | * | 9/2005 | Fujiwara et al. ........... | 455/435.1 |

FOREIGN PATENT DOCUMENTS

| JP | 10177552 | A | 6/1998 |
|---|---|---|---|
| JP | 2002032340 | A | 1/2002 |
| JP | 2002149605 | A | 5/2002 |
| JP | 2003242109 | A | 8/2003 |
| JP | 2005-321970 | A | 11/2005 |
| JP | 2005321970 | A | 11/2005 |

OTHER PUBLICATIONS

Japanese Office Action dared Aug. 2, 2011 for corresponding Japanese Application No. 2006167351.

* cited by examiner

*Primary Examiner* — Gilberto Barron, Jr.
*Assistant Examiner* — Yonas Bayou
(74) *Attorney, Agent, or Firm* — Sughrue Mion, PLLC (57) ABSTRACT

A computer readable recording medium storing a control program causing a computer to execute a process in which an authentication proxy terminal carries out authentication on behalf of a client terminal using a browser to one or more server terminals, the process which includes: performing user authentication between the client terminal and the authentication proxy terminal before an access from the client terminal using the browser to the server terminal; if the user authentication is properly performed, executing proxy authentication to the server terminal on behalf of the client terminal; and sending to the client terminal a script file that controls the browser so as to access the server terminal without involving the authentication proxy terminal at a time of the access using the browser from the client terminal to the server terminal after the proxy authentication is properly executed.

6 Claims, 6 Drawing Sheets

FIG.1

```
function FindProxyForURL (url, host) {
   if ( url = "http://somehost.somedomain. com/allo/servlet/Login"
      |[ = "http://anotherhost. anotherdomain.com/appl/servlet/logOn") {
         return "PROXY authproxy. somedoma in. com:8080":
   ]
   return "DIRECT":
}
```

RECORDING MEDIUM STORING CONTROL PROGRAM AND COMMUNICATION SYSTEM

BACKGROUND

1. Technical Field

The present invention relates to a recording medium storing a control program and a communication system.

2. Related Art

An SSO (Single Sign-On) system in which once accepted for an authentication, a user can use all other functions which the authentication permits has been proposed.

When a network system is operated in a school, organization, or the like, in order to increase a security, a proxy server that performs a connection to the external network substitute for computers in the internal network is installed at a boundary between the internal network and the external network (for example, the Internet). This proxy server is used when connecting from the internal network to the server in the external network, and may be called as a forward proxy.

Contrary to the forward proxy that relays a connection from the internal network to the external network, a reverse proxy relays a connection from the external network to the internal network. Additionally, the reverse proxy is used not limited to connect from the external network to the internal network, and it is also often used within the same network.

SUMMARY

A first aspect of the invention provides a computer readable recording medium storing a control program causing a computer to execute a process in which an authentication proxy terminal carries out authentication on behalf of a client terminal using a browser to one or more server terminals, the process which includes: performing user authentication between the client terminal and the authentication proxy terminal before an access from the client terminal using the browser to the server terminal; if the user authentication is properly performed, executing proxy authentication to the server terminal on behalf of the client terminal; and sending to the client terminal a script file that controls the browser so as to access the server terminal without involving the authentication proxy terminal at a time of the access using the browser from the client terminal to the server terminal after the proxy authentication is properly executed.

BRIEF DESCRIPTION OF THE DRAWINGS

An exemplary embodiment of the present invention will be described in detail based on the following figures, wherein.

DETAILED DESCRIPTION

Hereinbelow, an exemplary embodiment of a recording medium storing a control program and a communication system according to the present invention will be described in detail with reference to the attached drawings.

Figure 1:
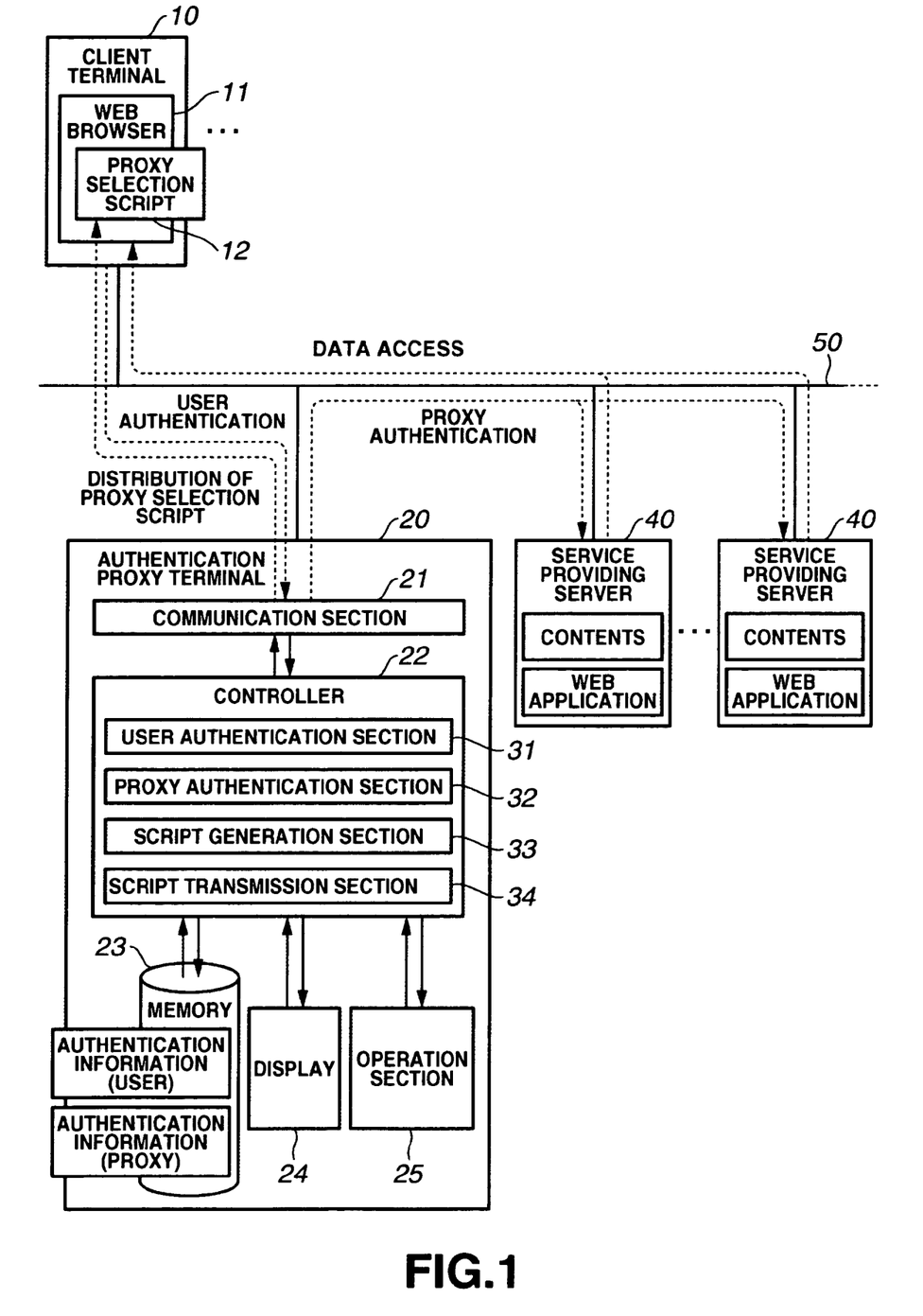
FIG. 1 is a diagram illustrating one example of an overall configuration of a communication system pertaining to the present invention.

FIG. 1 is a diagram illustrating one example of an overall configuration of the communication system according to the present invention.

In this communication system, one or more client terminals 10 are connected to an authentication proxy terminal 20 and one or more service providing servers 40 via a network 50 configured with LAN (Local Area Network) or WAN (Wide Area Network). In this communication system, an SSO system is realized through controlling by the authentication proxy terminal 20. In other words, once authentication is properly made by the authentication proxy terminal 20, this authentication proxy terminal 20 performs a proxy authentication to each of the service providing servers 40. After this authentication by the authentication proxy terminal 20 is properly completed, the authentication proxy terminal 20 performs the proxy authentication to each of the service providing servers 40, and a user is not required to perform the authentication to any of the service providing servers 40 at the time of access. Note that the network configuration of this communication system shows only one example. And various network terminals, such as an application server, and a Web server, other than elements of this configuration, may be connected to the network 50.

Here, the client terminal 10 is provided with a Web browser 11 as an application for browsing HTML contents and the like. This Web browser enables the client terminal 10 to perform a data communication with the authentication proxy terminal 20, the service providing server 40, and the like.

In general, the Web browser 11 is provided with a function that automatically configures the proxy servers by using a proxy selection script 12 (this script is called automatic configuration script file, etc. in the Internet Explorer). In other words, the Web browser 11 has a scheme that makes the proxy setting automatically perform, and using this scheme, a communication path of the Web browser 11 can be easily changed.

The service providing server 40 keeps resources such as HTML contents, various information including images and the like, the Web application, etc., and provides these information, etc. in response to an http request from the client terminal 10 via the Web browser 11. Additionally, this service providing server 40 keeps static contents (for example, HTML contents, etc) and dynamic contents (for example, Web application, etc.), and is equipped with both the Web server and the application server functions. This configuration, however, is only one example, and the server may be equipped only with either of the functions.

When the client terminal 10 accesses the service providing server 40 for the first time, an authentication process between the client terminal 10 and the authentication proxy terminal 20 is necessary first. Here, when the user activates the Web browser 11, the proxy selection script 12 is downloaded from the authentication proxy terminal 20 to the Web browser 11 in the client terminal 10.

After downloading this script is completed, an authentication then begins. An authentication display is shown on the client terminal 10, for example, in a manner of popping-up. The user, who sees the authentication display, inputs user's account or password from an operation section such as a keyboard, or a mouse, and then sends an authentication information to the authentication proxy terminal 20. Additionally, even when the user directly accesses the service providing server 40 before performing the authentication, the access is to be redirected, and the authentication is required from the authentication proxy terminal 20 as mentioned-above, detailed description for this being omitted because this is a conventionally well-known art.

When this authentication is properly performed, the authentication proxy terminal 20 performs the proxy authentication to the service providing server, and the access to the service providing server 40 is permitted only by this one authentication. Here, when the user tries to access the service providing server 40, the user directly accesses the service providing server 40 without connecting through the authentication proxy terminal 20 in accordance with the proxy selection script 12 downloaded during the above process. In other words, only the access to the authentication display can be transmitted through the authentication proxy terminal 20, and other accesses are directly accessed to the service providing server 40.

As mentioned above, in this exemplary embodiment, the authentication proxy terminal 20 functions only for the authentication, and is not involved in the access to the service providing server 40 after the authentication is successfully completed. Conventionally, in this kind of system, whenever requesting for the authentication or accessing after establishing the authentication, the user accesses the service providing server 40 only through an authentication proxy terminal shown in FIG. 1 (also called as a relay server). In the present exemplary embodiment, however, if the authentication is normal, the user can directly access the service providing server 40 for the access performed within an authentication time, etc.

Here, a part of a functional configuration of the authentication proxy terminal 20 shown in FIG. 1 will be described.

The authentication proxy terminal 20 includes, as the functional configuration, a communication section 21, a controller 22, a memory 23, a display 24, and an operation section 25.

The communication section 21 is configured with a network card and the like, and functions as a communication interface that controls a communication between the authentication proxy terminal 20 and the network 50. The authentication proxy terminal 20 performs a data communication with the client terminal 10 and the service providing server 40 via this communication section 21.

The controller 22 is equipped with a CPU (Central Processing Unit), a working memory and the like. This CPU reads and performs a control program stored in the working memory as a work area in the memory 23, and then a control process according to the exemplary embodiment is performed.

The memory 23 is configured with an HD (Hard Disk) and the like, and functions as a storing device that stores various data. In addition to storing various programs, this memory 23 stores user information, application information and the like, necessary for operating a general SSO system.

The display 24 is a display device and the like that display various types of information. The operation section 25 is an input device, such as a keyboard and a mouse, for inputting user instructions. These are the descriptions of processing functions that configures the authentication proxy terminal 20. Note that the display 24, the operation section 25, and the memory 23 are not essential elements for the authentication proxy terminal 20, and can be omitted. However, when the memory 23 is omitted, a server or the like that maintains information necessary for the authentication is separately prepared, and the authentication is performed based on a request for the server.

Next, a part of a functional configuration of the above-described controller 22 will be described. Note that processing functions (function blocks) that are performed in the controller 22 are mainly realized by the CPU that performs control programs stored in the memory 23.

The controller 22 includes, as various processing function sections, a user authentication section 31, a proxy authentication section 32, a script generation section 33, and a script transmission section 34.

The user authentication section 31 performs a user authentication to the client terminal 10. This user authentication is performed based on authentication information for the user authentication that is previously stored in the memory 23. Here, when the authentication is properly completed, the proxy authentication is performed for each of the service providing servers 40, whereby the SSO is realized.

The proxy authentication section 32 performs the authentication to the service providing server 40 on behalf of the client terminal 10. Specifically, when the authentication between the client terminal 10 and the authentication proxy terminal 20 is properly completed, the authentication to the service providing server 40 is performed by using the authentication information for the proxy authentication corresponding to the user, the authentication information being previously stored in the memory 23.

Figure 2:
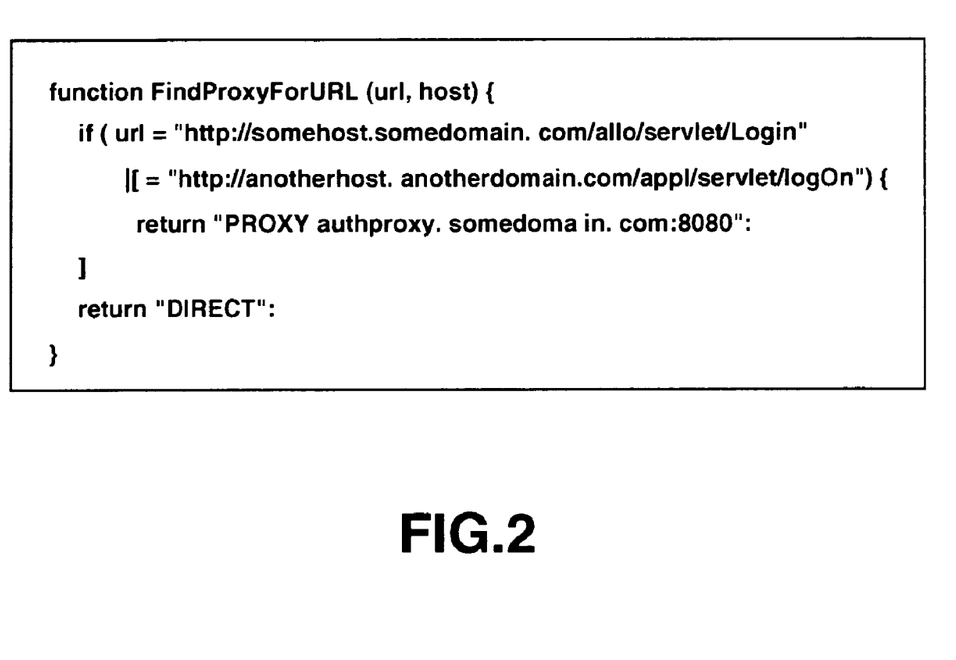
FIG. 2 is a diagram illustrating one example of a proxy selection script 12 shown in FIG. 1.

The script generation section 33 performs a function of generating the above-mentioned proxy selection script 12. For example, a script file shown in FIG. 2 is generated. As shown in FIG. 2, the script file is usually written in Java® Script, and is a simple file in which execution commands are written line by line in order.

For example, the file shown in FIG. 2 has a setting that when an access to an authentication display (URL) that meets a condition of an if-structure is performed, this access is done via the authentication proxy terminal 20. And when the access is performed to other destination, the access is done directly to the targeted server without passing through the authentication proxy terminal 20. In other words, this file has a setting that only the request that is directed to the authentication display is transmitted to the authentication proxy terminal 20.

The script transmission section 34 performs a function to transmit the proxy selection script 12 that is generated in the script generation section 33 to the client terminal 10. In other words, a script file for changing a communication path of the Web browser 11 so as not to pass through the authentication proxy terminal 20 after completing the authentication is downloaded to the client terminal 10, so that the generated script file is set to the client terminal 10 by storing the file to the prescribed folder, etc., or other manners.

The above-mentioned description is the processing functions that the controller 22 includes. Note that the script generation section 33 is not necessarily substantial configuration elements, and can be omitted. When the script generation section 33 is omitted, the proxy selection script 12 is stored in advance in the memory 23 and the like, and is transmitted to the client terminal 10 by the script transmission section 34.

Here, using FIG. 3, a flow of a communication sequence in a case where an unauthenticated Web browser 11 accesses the service providing server 40 will be described.

First, after the Web browser 11 is started up, upon request from the Web browser 11, the proxy selection script 12 is generated by the script generation section 33 in the authentication proxy terminal 20, is transmitted to the client terminal 10 by the script transmission section 34, and is set. (1: obtaining script ( )).

After receiving the generated proxy selection script 11, the Web browser 11 accesses, according to the proxy selection script 12, the authentication proxy terminal 20, and then the authentication display is displayed on the client terminal 10 using a pop-up and the like. Here, when the user enters an account, a password or the like, the user authentication section 31 performs the authentication, and the authentication process is performed between the client terminal 10 and the authentication proxy terminal 20. (2: user authentication ( )).

When this user authentication is properly completed, the Web browser 11 accesses a URL for authentication in order to participate in the SSO. (3: access to authentication URL ( )). After receiving the access from the Web browser 11, the proxy authentication section 32 in the authentication proxy terminal 20 requests the authentication to the service providing server 40 on behalf of the client terminal 10. This proxy authentication is performed by transmitting to the service providing server 40 the authentication information for proxy authentication that is stored in the memory 23 in the authentication proxy terminal 20. (3.1: authentication display of application ( ) and 3.2: proxy authentication ( )). When there is no proxy authentication information corresponding to the user, the authentication display is displayed on the Web browser 11, and the user itself directly enters the information. After this authentication process by the user, the proxy authentication is automatically performed because the authentication information entered by the user is stored in the memory 23 as the information for the proxy authentication.

And, when this proxy authentication is properly completed, a notification for the authentication is sent to the Web browser 11 from the authentication proxy terminal 40. After receiving this notification, the Web browser 11 directly accesses the service providing server 40 without passing through the authentication proxy terminal 20. (4: data access ( )). In other words, this is because the proxy selection script 12 provides a setting to directly access the service providing server 40 except a case where a request from the client terminal 10 for displaying the authentication display is made.

Next, using FIG. 4, a flow of a communication sequence in a case of using a redirection when an authenticated Web browser 11 accesses the service providing server 40 will be described. FIG. 4 shows a flow of a process when a direct access to the service providing server 40 is performed before the authentication. In a practical operation, it seems that the communication sequence shown in FIG. 4 is performed more frequently than that shown in FIG. 3.

First, when the Web browser 11 is started up, upon request from this Web browser 11, the proxy selection script 12 is generated by the script generation section 33 in the authentication proxy terminal 20, and is transmitted to the client terminal 10 by the script transmission section 34 to be set. (1: obtaining script ( )).

After receiving the proxy selection script 12, the Web browser 11 accesses, according to the proxy selection script 12, the authentication proxy terminal 20, and an authentication display is displayed on the client terminal 10 using a pop-up and the like. Here, when the user enters an account, a password, or the like, the user authentication section 31 performs the authentication, and the authentication process is performed between the client terminal 10 and the authentication proxy terminal 20. (2: user authentication ( )).

After this user authentication is properly complete, when the access from the Web browser 11 to the service providing server 40 is performed without completing the authentication for participating in the SSO, the service providing server 40 knows, by referring to Cookies and the like, that the Web browser is not authenticated. Then, the service providing server 40 issues a redirection to an authentication URL. (3: access to application ( )).

After receiving this redirection, the Web browser 11 accesses the URL for the authentication in accordance with the redirection. (4: access to authentication URL ( )). Then, the proxy authentication section 32 in the authentication proxy terminal 20 that receives this access performs the authentication for the service providing server 40 on behalf of the client terminal 10. This proxy authentication is performed by transmitting to the service providing server 40 the authentication information for the proxy authentication stored in the memory 23 in the authentication proxy terminal 20. (4.1: authentication display of application ( ) and 4.2: proxy authentication ( )). When there is no proxy authentication information corresponding to the user, the authentication display is displayed on the Web browser 11, and the user itself directly enters the information. After this entrance by the user, this entered authentication information is stored in the memory 23 as the proxy authentication information, and the proxy authentication is automatically performed after this.

After this proxy authentication is properly performed, a redirection to the application is sent from the authentication proxy terminal 40 to the Web browser 11. After receiving this redirection, the Web browser 11 directly accesses the service providing server 40 without passing through the authentication proxy terminal 20. (5: access to redirected destination ( )). In other words, this is because the proxy selection script 12 provides a setting to directly access the service providing server 40 except a case where the request from the client terminal 10 for displaying the authentication display is made.

Figure 3:
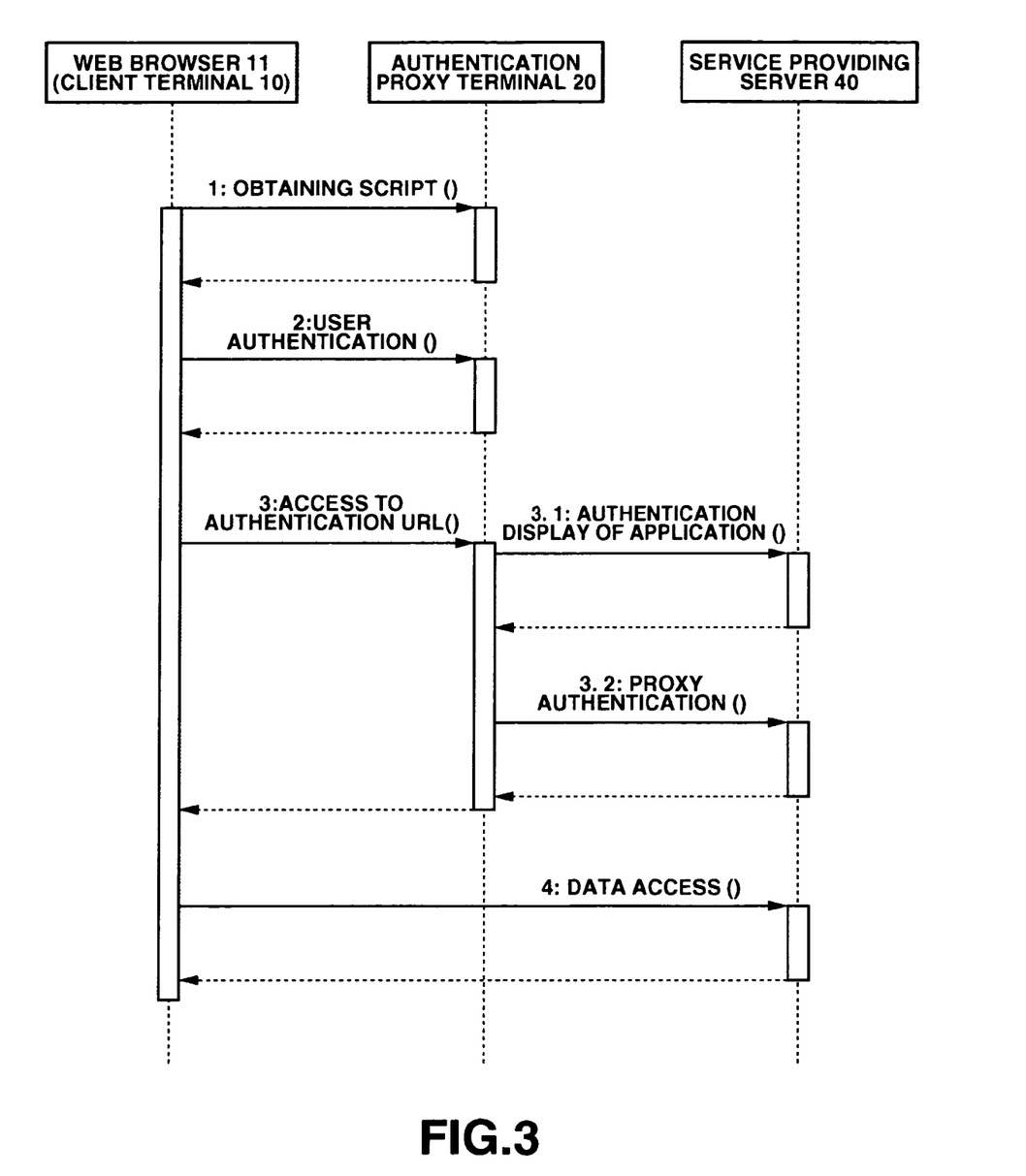
FIG. 3 is a flow illustrating a communication sequence pertaining to the communication system shown in FIG. 1.
Figure 4:
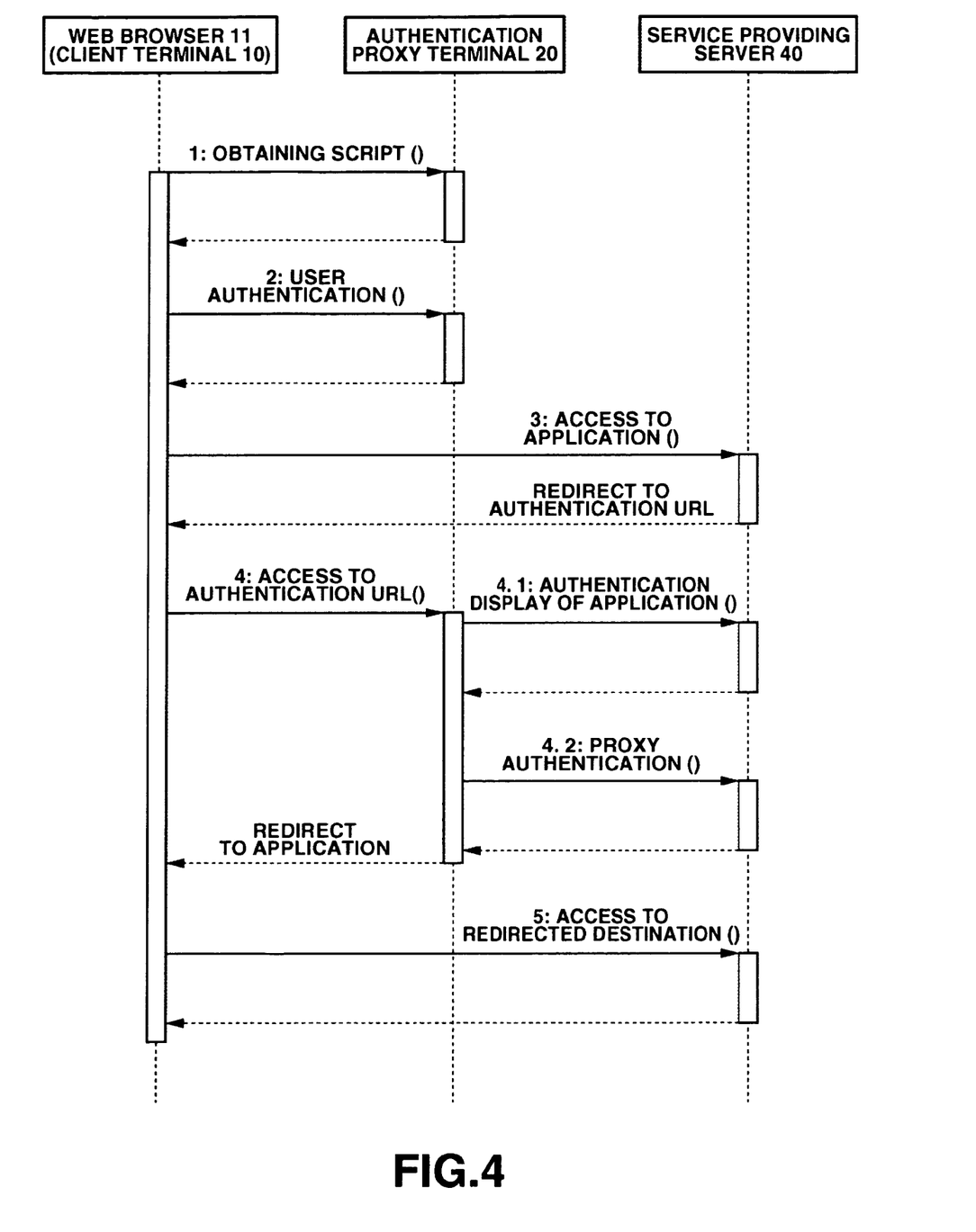
FIG. 4 is a flow illustrating a communication sequence pertaining to the communication system shown in FIG. 1 (with redirection)

Note that obtaining the script, which is described using FIGS. 3 and 4, is basically necessary for just one time. After the obtainment, even when the Web browser 11 is closed or the client terminal 10 is rebooted, the script is not deleted. Thus, re-downloading is necessary only when change of the contents of the proxy selection script 12 themselves and the like occurs.

In the communication sequence described in FIGS. 3 and 4, description is made, as one example, for a case where the access from the Web browser 11 to the authentication URL is necessary after the user authentication in order to participate in the SSO. In addition to this example, the proxy authentication may be automatically performed after the user authentication is completed without accessing the authentication URL. This can be achieved by modifying the operation setting of the authentication proxy terminal 20 as appropriate.

Hereinabove, one example of typical exemplary embodiments of the present invention has been described. However, the present invention is not limited to the embodiment described above and the attached drawings, and can be implemented by modifying as appropriate within the gist of the invention.

Figure 5:
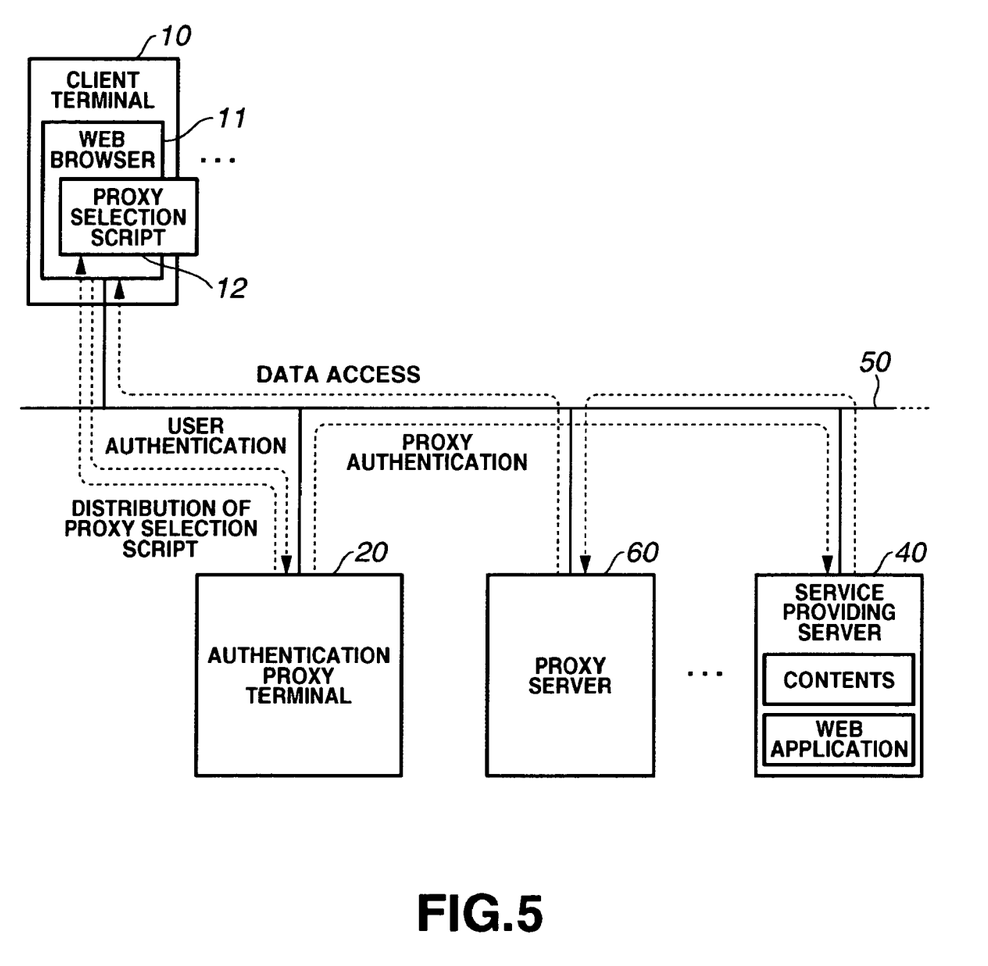
FIG. 5 is a diagram illustrating one example of an overall configuration of a first modification according to the present invention.
Figure 6:
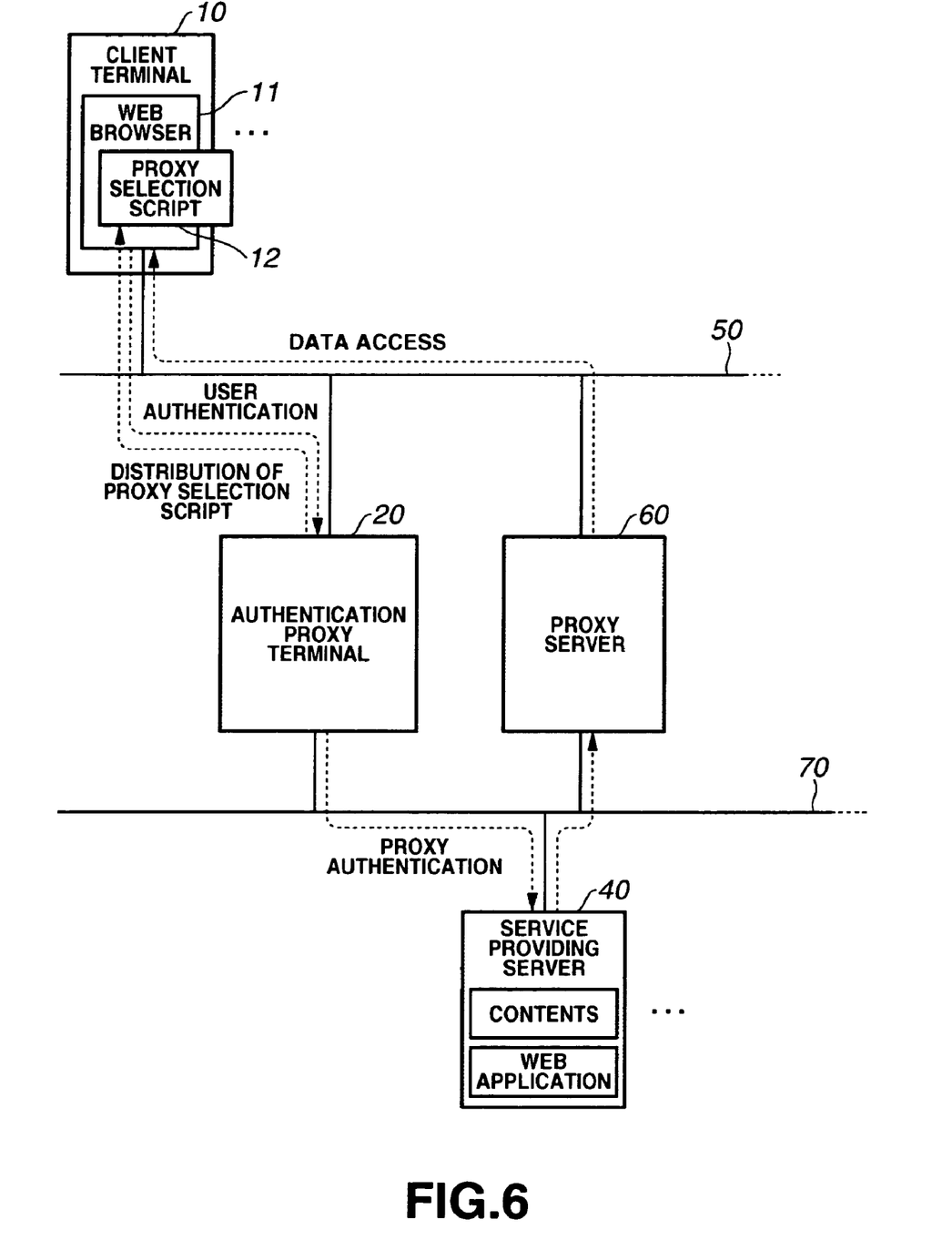
FIG. 6 is a diagram illustrating one example of an overall configuration of a second modification according to the present invention.

For example, in the above-mentioned exemplary embodiment, a case where a direct access from the Web browser 11 to the service providing server 40 after the authentication during the data access has been described as an example. However, in the present invention, only the authentication (if not causing the large amount of performance degradation, processes other than the authentication, such as accumulating logs, may be applicable) is performed by the authentication proxy terminal 20, and after the authentication an access from the client terminal 10 to the service providing server 40 can be performed through any communication paths. Accordingly, as shown in FIG. 5, for example, when a dedicated proxy sever 60 is provided and an access to the service providing server 40 is performed, the present invention may be configured to always access through this dedicated proxy server 60. Additionally, as another configuration having the proxy server 60, as shown in FIG. 6, the service providing server 40 may be connected to other network 70 rather than the network 50 to which the client terminal 10 and the like is connected. Note that, when this type of proxy server 60 is provided, an access is performed through the proxy server 60 dedicated to the data communication processing. As a result, the security can be strengthened without degrading the performance.

Additionally, in the above-mentioned exemplary embodiment, a case where the process is performed by the communication system according to the present invention has been described. However, this process can be performed by configuring a control program installed in a computer. Note that this control program can be provided through communication section such as a network, and furthermore, can be provided by storing a recording medium such as a CD-ROM.

The control program and the communication system according to the present invention is applicable to general control programs and communication systems that cause a computer to execute a process to alternatively perform the authentication to one or more server terminals.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A computer readable recording medium storing a control program causing a computer to execute a process, the process comprising:
    performing user authentication between a client terminal and an authentication proxy terminal before an access, using a browser, from the client terminal to one or more server terminals;
    if the user authentication is properly performed, executing proxy authentication with the one or more server terminals on behalf of the client terminal; and
    after the proxy authentication is properly executed, utilizing a script file, downloaded from the authentication proxy terminal to the browser prior to performing the user authentication, that controls the browser so as to access the one or more server terminals directly from the client terminal without passing through the authentication proxy terminal at a time of the access.

2. The computer readable recording medium according to claim 1, wherein the script file controls the browser so as to access the one or more server terminals from the client terminal via a proxy server at the time of the access.

3. The computer readable recording medium according to claim 1, the process further comprising:
    generating the script file, and
    sending the generated script file upon request from the client terminal.

4. The computer readable recording medium according to claim 2, the process further comprising:
    generating the script file, and
    sending the generated script file upon request from the client terminal.

5. A computer readable recording medium storing a control program causing a computer to execute a process, the process comprising:
    sending a script file that controls a browser so as to access an authentication proxy terminal at a time of authentication from a client terminal using the browser, and so as to directly access one or more server terminals without passing through the authentication proxy terminal at a time of other access than the access for the authentication;
    performing user authentication between the client terminal and the authentication proxy terminal before the access from the client terminal using the browser to the one or more server terminals; and
    if the user authentication is properly performed, executing proxy authentication to the one or more server terminals on behalf of the client terminal.

6. A communication system, comprising:
    a client terminal that is configured to access, using a browser, one or more server terminals; and
    an authentication proxy terminal that performs authentication to the one or more server terminals on behalf of the client terminal,
    the authentication proxy terminal including:
    an authentication section that performs user authentication with the client terminal before the access, using the browser, from the client terminal to the one or more server terminals;
    a proxy authentication section that executes proxy authentication with the one or more server terminals on behalf of the client terminal, if the user authentication is properly performed; and
    a sending section that, after the proxy authentication is properly executed, utilizes a script file, downloaded from the authentication proxy terminal to the browser prior to performing the user authentication, that controls the browser so as to access the one or more server terminals directly from the client terminal without passing through the authentication proxy terminal at a time of the access,
    wherein, the browser in the client terminal accesses the one or more server terminals based on the script file.

* * * * *